US007925596B2

(12) United States Patent
Deshayes et al.

(10) Patent No.: US 7,925,596 B2
(45) Date of Patent: Apr. 12, 2011

(54) HIGH-RATE FRANKING MACHINE

(75) Inventors: Xavier Deshayes, Croissy (FR); Claude Tetard, Saint Rémy l'honoré (FR)

(73) Assignee: Neopost Industrie, Bagneux (FR)

( * ) Notice: Subject to any disclaimer, the term of this patent is extended or adjusted under 35 U.S.C. 154(b) by 3049 days.

(21) Appl. No.: 09/953,286

(22) Filed: Sep. 17, 2001

(65) Prior Publication Data

US 2002/0040354 A1 Apr. 4, 2002

(30) Foreign Application Priority Data

Sep. 29, 2000 (FR) ..................................... 00 12409

(51) Int. Cl.
*G06F 17/00* (2006.01)

(52) U.S. Cl. ........................................ 705/408; 705/401

(58) Field of Classification Search .................. 400/435, 400/56; 271/275, 34, 35; 705/406, 408; 347/104

See application file for complete search history.

(56) References Cited

U.S. PATENT DOCUMENTS 5,065,170 A * 11/1991 Rezanka et al. ................ 347/42
5,233,657 A * 8/1993 Gunther .......................... 705/60
5,326,181 A * 7/1994 Eisner et al. .................. 400/104
5,428,375 A * 6/1995 Simon et al. .................... 347/12
5,677,719 A * 10/1997 Granzow ...................... 347/103
5,730,049 A * 3/1998 Broschart ...................... 101/91
5,806,994 A 9/1998 Coffy et al.
5,838,343 A * 11/1998 Chapin et al. .................. 347/22
5,963,927 A * 10/1999 Herbert ......................... 705/401
6,026,385 A * 2/2000 Harvey et al. ................. 705/408
6,076,910 A * 6/2000 Anderson ....................... 347/12
6,116,715 A * 9/2000 Lefebvre et al. ................ 347/19
6,361,163 B1 * 3/2002 Fowlkes ........................ 347/104
6,367,910 B1 * 4/2002 Sette et al. ...................... 347/37
6,523,014 B1 * 2/2003 Pauschinger .................. 705/410
6,853,990 B1 * 2/2005 Thiel ............................ 705/401
2001/0002958 A1 * 6/2001 Ito .................................. 400/62

FOREIGN PATENT DOCUMENTS

EP 0822086 A2 4/1998
EP 0934828 A2 11/1999

OTHER PUBLICATIONS

"Eastpack Show Report", Plunkett, Jum, Food & Drug Packaging, v 64, n5, p38, May 2000.*

* cited by examiner

*Primary Examiner* — Rutao Wu
(74) *Attorney, Agent, or Firm* — Sughrue Mion, PLLC

(57) ABSTRACT

This invention relates to a high-rate franking machine comprising means for printing postal indicia on a mailpiece and means for transporting this mailpiece along a mailpiece-conveying path, said printing means comprising, arranged side by side transversely to a direction D of advance of the mailpieces along said mailpiece-conveying path, a first printing module arranged in a first position (position of printing) above said mailpiece-conveying path and a second printing module arranged in a second position (position of maintenance/standby) set back with respect to said mailpiece-conveying path. The first printing module is associated with a first maintenance station and the second printing module is associated with a second maintenance station.

8 Claims, 2 Drawing Sheets

HIGH-RATE FRANKING MACHINE

FIELD OF THE INVENTION

The present invention relates to the exclusive domain of mail processing and concerns a high-rate franking machine, i.e. one capable of attaining and even of exceeding a processing rate of 20 000 envelopes per hour.

BACKGROUND OF THE INVENTION

Such a rate of franking is at the present time not attained by any machine available on the market, due to the necessity of maintaining an optimum quality of printing for the postal indicia (which is a monetary value). In addition, in franking machines of the ink jet type, it is necessary to stop the ejection of the drops of ink regularly in order to scrape and clear the ejection nozzles to avoid accumulation of dirt and therefore blockage of the printing.

In order to increase the printing rates, U.S. Pat. No. 3,869,986 and European Patent Application EP 0 172 561 have proposed to separate the franking data into fixed data and variable data. However, although such a solution does allow an increase in the rates, it does not allow 20 000 and more envelopes to be processed due to the necessary periodic maintenance of the ink jet printing means.

It is an object of the present invention to overcome the drawbacks set forth hereinabove and to propose a high-rate franking machine of particularly high performance while remaining simple to use and, especially, which can ensure continuous operation.

SUMMARY OF THE INVENTION

These objects are attained by a high-rate franking machine comprising means for printing postal indicia on a mailpiece and means for transporting this mailpiece along a mailpiece-conveying path, characterized in that said printing means comprise, arranged side by side transversely to a direction D of advance of the mailpieces along said mailpiece-conveying path, a first printing module arranged in a first position (position of printing) above said mailpiece-conveying path and a second printing module arranged in a second position (position of maintenance/standby) set back with respect to said mailpiece-conveying path.

With this franking machine, it thus becomes possible to print a very large number of mailpieces continuously with an optimum quality of print and to maintain without particular difficulties a franking rate of more than 20 000 envelopes per hour. Above all, such a machine ensures continuous operation.

The first printing module is advantageously associated with a first maintenance station and the second printing module is associated with a second maintenance station and each of said printing modules is connected to a means for metering the frankings, itself connected to means for general control of the machine.

This franking machine further comprises means for displacing said printing modules from said first position (position of printing) to said second position (position of maintenance/standby) and vice versa, which displacement means are controlled by said general control means at predetermined moments corresponding to a predetermined number of envelopes or to the appearance of a predetermined threshold such as a low level of an ink reservoir. The user can parameter this predetermined number or threshold.

In order to print said postal indicia at the same determined place on said mailpiece whatever the printing module used for printing these indicia (first or second module), this high-rate franking machine also comprises means for provoking a time shift in the printing cycle.

BRIEF DESCRIPTION OF THE DRAWINGS

The invention will be more readily understood on reading the following description given by way of indicative and non-limiting example, with reference to the accompanying drawings, in which.

DESCRIPTION OF PREFERRED EMBODIMENT

A franking machine conventionally comprises means for printing postal indicia on a mailpiece and means for transporting this mailpiece along a conveying path of this machine. In modem machines, the printing means are of the ink jet type and, for certain of them, of the disposable type, and are associated with a maintenance station which ensures periodic maintenance of the ejection nozzles. These printing means are connected to a base of the franking machine which comprises means for metering the frankings (ascending and descending registers) and the means for general control and synchronization of the machine (in particular of its conveying means and the maintenance station). In an open architecture, these control means may be connected to an outside computer which, through a modem, will be in relation with an outside server of the Postal Administration or of the franchise holder of the franking machine.

According to the invention, it is proposed to duplicate the assembly constituted by the indicia printing means and the station for maintaining these printing means. This duplication of the printing and maintenance means allows a totally continuous mail processing without untimely stoppage associated with regular maintenance or with the change of ink reservoirs (in the case of disposable heads) or for filling a principal ink supply reservoir. A change of ink type and/or colour or the use of two distinct colours does not pose any particular problem.

The printing means may be changed at predetermined moments corresponding to a number of envelopes processed (for example every 3 000 envelopes) or to the appearance of a predetermined threshold (such as the low level of an ink reservoir). Such predetermined instants may be set in the factory or be parametered by the user.

Figure 1:
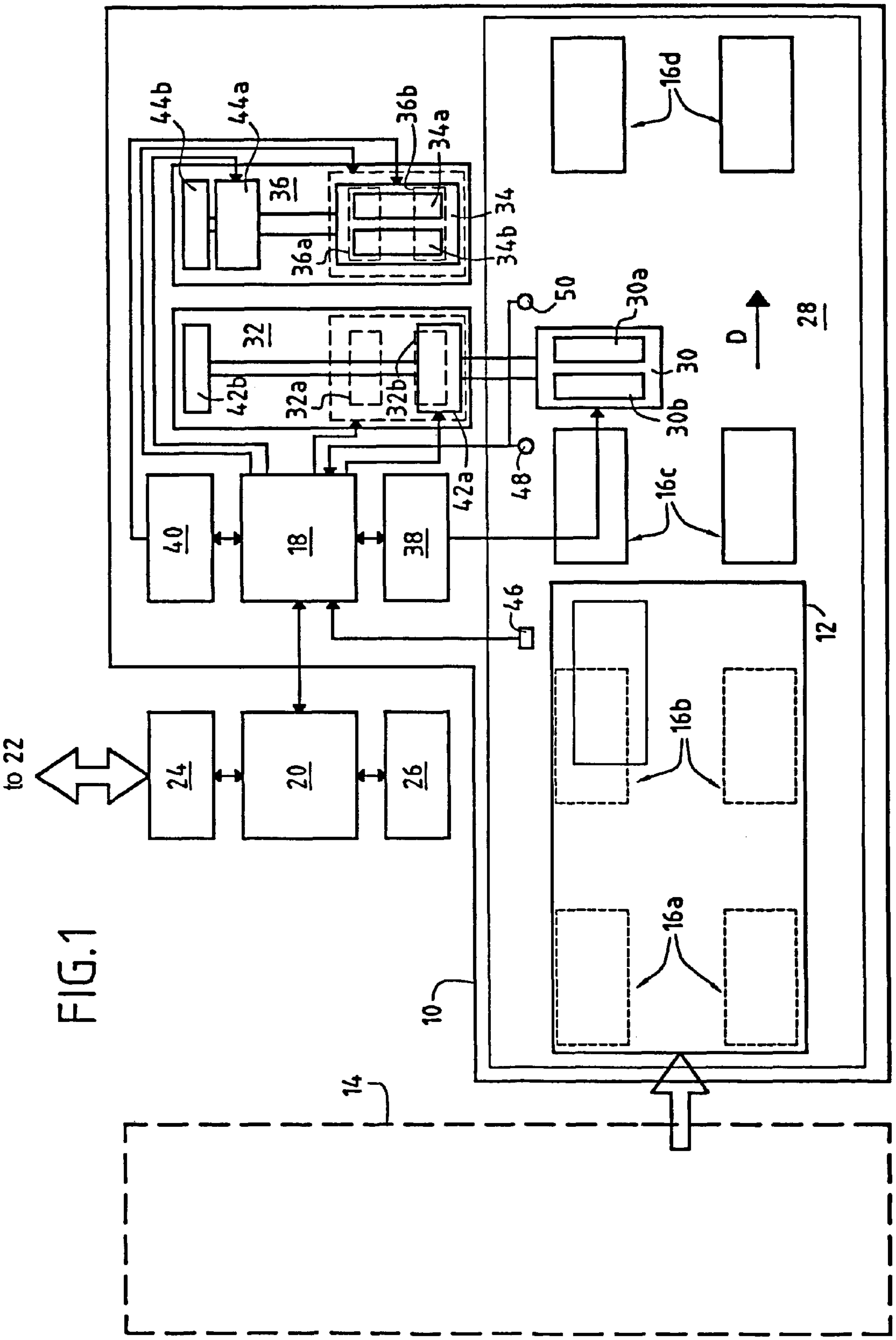
FIG. 1 schematically shows an embodiment of a high-rate franking machine according to the invention.

Referring now to the drawings, FIG. 1 shows an embodiment of a high-rate franking machine according to the invention.

This machine 10 intended for franking mailpieces 12, such as envelopes, and which may be arranged directly at the outlet of a folding/insertion module 14, comprises, as in a conventional machine, mailpiece-conveying means formed by a plurality of series of conveyor rollers, for example 16*a*, 16*b*, 16*c*, 16*d* and general means 18 for controlling and synchronizing the machine. These control means may be connected to an outside computer 20 and an outside server 22 via a modem 24. A printer 26 connected to the computer further allows various statements to be printed.

According to the invention, the printing means are duplicated and comprise, arranged side by side transversely to a direction D of advance of the mailpieces along the mailpiece-conveying path 28, a first printing module 30 with which is associated a first corresponding maintenance station 32 and a second printing module 34 with which is likewise associated a second maintenance station 36. These printing means are connected in the base to individual metering means 38, 40 themselves connected to the control means 18. These metering means 38, 40 may be joined to form a single metering module. One of them may also transfer its data to the other for purposes of periodic consolidation, for example at the end of the day.

Each printing module advantageously comprises two printing heads with which are associated ink reservoirs 30*a*, 30*b*; 34*a*, 34*b*. The maintenance stations are preferably of the type such as described in Applicants' French Patent Application No. 2 768 078. They are set back with respect to their respective printing module transversely to said direction D and comprise at least means for scraping the ejection nozzles 32*a*; 36*a* and means for protecting these nozzles 32*b*; 36*b*. Means for supporting the first and second printing modules, advantageously in the form of mobile carriages 42*a*; 44*a* actuated for example by controlled devices 42*b*; 44*b* incorporating endless screws, are provided to allow these modules to move between a first, active position above a mailpiece corresponding to the printing of postal indicia on this mailpiece, and a second, inactive position set back from the mailpiece-conveying path 28 and corresponding to a position of cleaning of the printing heads, for change of ink type (colour, fluorescence, phosphorescence) or simply a temporary standby position.

A tachometer 46 and at least one position sensor 48, 50 are provided on the path 28 in order to detect the front ends of the mailpieces and possibly their lengths and to allow, in liaison with the control means 18 to which they are connected, the synchronization of the phases of transport and of printing of these mailpieces, as well as the transverse displacement of the first and second printing modules.

The principle of operation implemented in a franking machine according to the invention will now be illustrated with reference to the simplified diagram of FIG. 2 and the timing diagrams of FIGS. 3*a* to 3*f*.

Figure 2:
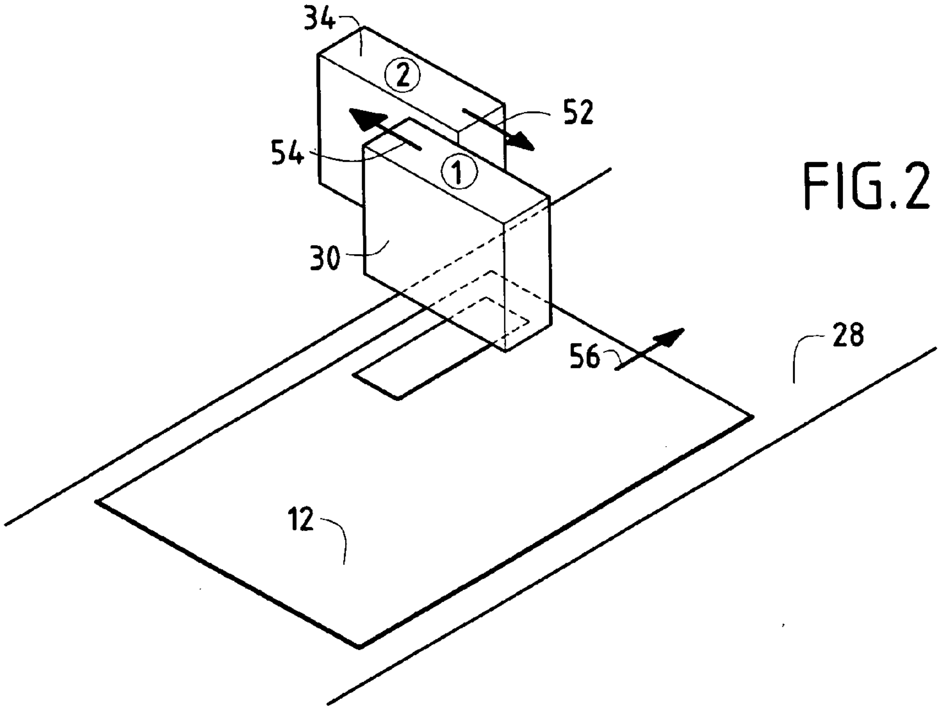
FIG. 2 schematically shows a view in perspective illustrating the relative displacement of the envelope with respect to the high-rate printing means of the invention.
Figure 3:
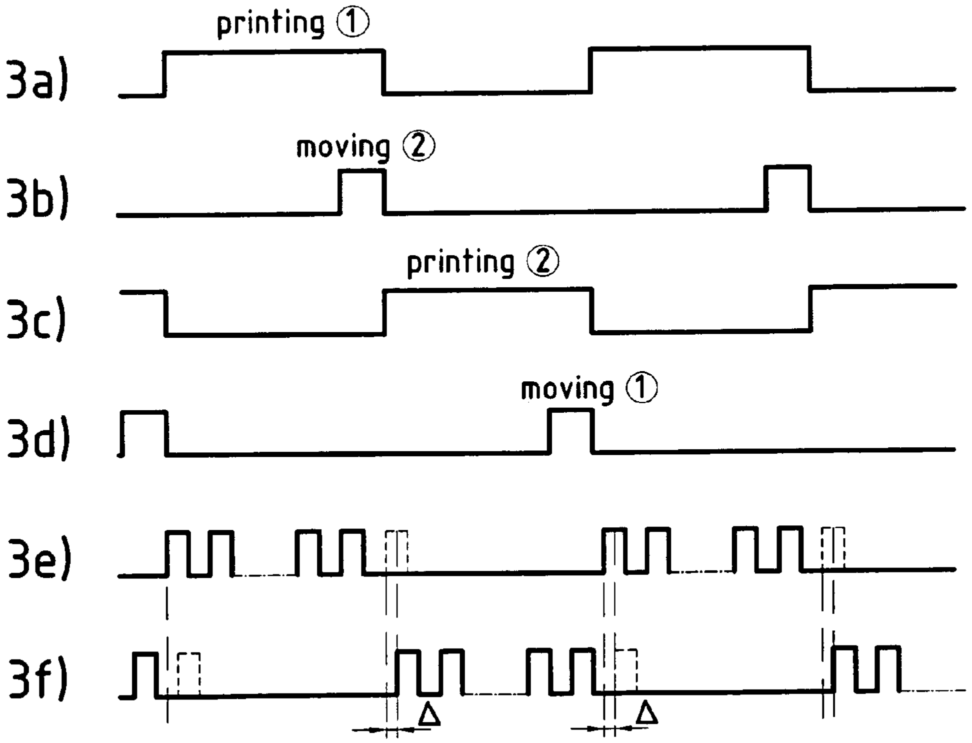
FIGS. 3*a* to 3*f* are timing diagrams illustrating the different steps carried out by the printing means of FIG. 2.

In FIG. 2, the first printing module 30 is in position of printing (referenced 1 in FIG. 2) and the second module is in position of cleaning/standby (referenced 2 in FIG. 2). The first module will be assumed to be approaching the end of its operation (after having effected its 3 000 frankings). The second module 34 then comes into position next to the first module by moving transversely to the conveying path 28 in the direction of arrow 52 (timing diagram of FIG. 3*b*). As soon as the first module stops printing, the second module replaces it to print the following mailpieces. The first module 30 can then withdraw by moving transversely to the conveying path 28 in the direction of arrow 54 (timing diagram of FIG. 3*d*). It will remain in standby in this position up to its next replacement. It will be noted that, due to the offset positioning of the second module with respect to the first along the mailpiece-conveying path 28, and taking into account the necessity of affixing the postal indicia at a determined place on the mailpiece (which corresponds to a displacement of this mailpiece in the direction of arrow 56), it is necessary to provoke a time shift in the printing cycle. The timing diagrams of FIGS. 3*e* and 3*f* illustrate this shift of ±Δ of the first pulses corresponding to the printing of the first mailpiece for a given module. This shift is positive upon passage of printing from module 1 to module 2, it is negative in the contrary case (passage from module 2 to module 1).

With this specific process of printing, there is no discontinuity in printing, as shown by the timing diagrams of FIGS. 3*a* and 3*c* which are complementary of one another and on which the phases of printing and of cleaning/standby of the respective printing modules 1 and 2 alternate. In effect, while one module is in franking phase, the other is being cleaned or on temporary standby. Moreover, the ink reservoirs can be changed or filled during this standby period, this significantly reducing possible stoppages of the machine.

What is claimed is:

1. High-rate franking machine comprising:

means for transporting a mailpiece along a mailpiece-conveying path;

means for printing postal indicia on the mailpiece, said printing means comprising first and second printing modules alternately moveable from a printing position along the conveying path at which printing of the postal indicia occurs and an off-set position displaced from the conveying path to permit cleaning of the print module, wherein when positioned in the printing position, the respective print module prints the entire postal indicia.

2. The high-rate franking machine of claim 1, wherein said first printing module is associated with a first maintenance station and said second printing module is associated with a second maintenance station.

3. The high-rate franking machine of claim 1, wherein each of said printing modules is connected to a metering means itself connected to means for general control of the machine.

4. The high-rate franking machine of claim 1, wherein each of said printing modules is connected to a common metering means itself connected to means for general control of the machine.

5. The high-rate franking machine of claim 1, further comprising means for displacing said printing modules from said printing position to said off-set position and vice versa.

6. The high-rate franking machine of claim 5, wherein said displacing means are controlled by said general control means at predetermined moments corresponding to a predetermined number of envelopes or to the appearance of a predetermined threshold.

7. The high-rate franking machine of claim 6, wherein said predetermined number or threshold can be parametered by the user.

8. The high-rate franking machine of claim 1, further comprising means for provoking a time shift in the printing cycle, so as to print said postal indicia at the same determined place on said mailpiece whatever the printing module used for printing the postal indicia.

* * * * *